(12) United States Patent
Kim et al.

(10) Patent No.: US 9,472,793 B2
(45) Date of Patent: Oct. 18, 2016

(54) BATTERY PACK

(71) Applicant: SK Innovation Co., Ltd., Seoul (KR)

(72) Inventors: Sangyeon Kim, Yongin-si (KR); Yun Nyoung Lee, Gwangmyeong-si (KR)

(73) Assignee: SK Innovation Co., Ltd., Seoul (KR)

( * ) Notice: Subject to any disclaimer, the term of this patent is extended or adjusted under 35 U.S.C. 154(b) by 89 days.

(21) Appl. No.: 14/415,408

(22) PCT Filed: Jun. 14, 2013

(86) PCT No.: PCT/KR2013/005275
§ 371 (c)(1),
(2) Date: Jan. 20, 2015

(87) PCT Pub. No.: WO2014/014203
PCT Pub. Date: Jan. 23, 2014

(65) Prior Publication Data
US 2015/0155533 A1 Jun. 4, 2015

(30) Foreign Application Priority Data

Jul. 18, 2012 (KR) .................. 10-2012-0078311

(51) Int. Cl.
*H01M 2/10* (2006.01)
*H01M 2/20* (2006.01)
*H01M 2/30* (2006.01)

(52) U.S. Cl.
CPC .......... *H01M 2/1077* (2013.01); *H01M 2/1022* (2013.01); *H01M 2/1061* (2013.01); *H01M 2/202* (2013.01); *H01M 2/30* (2013.01)

(58) Field of Classification Search
CPC .... H01M 2/30; H01M 2/1061; H01M 2/202; H01M 2/1077; H01M 2/1022
See application file for complete search history.

(56) References Cited

U.S. PATENT DOCUMENTS

| | | |
|---|---|---|
| 7,582,379 B2 | 9/2009 | Yoon et al. |
| 2007/0252556 A1* | 11/2007 | West ............ H01M 2/202 320/116 |
| 2010/0062329 A1 | 3/2010 | Muis |
| 2011/0151315 A1* | 6/2011 | Masson ........... H01M 2/1077 429/159 |
| 2011/0206978 A1* | 8/2011 | Muis ............... H01M 2/206 429/158 |
| 2011/0269008 A1* | 11/2011 | Houchin-Miller .. B60L 11/1874 429/120 |
| 2012/0161677 A1* | 6/2012 | Kunimitsu ........ H01M 2/1077 318/139 |
| 2013/0045403 A1 | 2/2013 | Shin et al. |
| 2015/0171401 A1* | 6/2015 | Kim ............... H01M 2/206 429/158 |

FOREIGN PATENT DOCUMENTS

| | | |
|---|---|---|
| EP | 2337119 A2 | 6/2011 |
| JP | 2004171856 A | 6/2004 |
| KR | 1020110132667 A | 12/2001 |
| KR | 1020040015314 A | 2/2004 |
| KR | 1020080063911 A | 7/2008 |

\* cited by examiner

*Primary Examiner* — Stewart Fraser
(74) *Attorney, Agent, or Firm* — The Webb Law Firm

(57) ABSTRACT

Provided is a battery pack having easily attachable and detachable battery modules, in which a plurality of battery modules are inserted, respectively, into receiving parts formed in a sub pack case, such that electrode terminals of the battery modules are coupled to a terminal stand formed at one side of the sub pack case to thereby be electrically connected to each other, and a sub pack case cover formed at the other side of the sub pack case is closed to fix the battery modules.

6 Claims, 10 Drawing Sheets

(a)

(b)

BATTERY PACK

CROSS-REFERENCE TO RELATED APPLICATIONS

This application is the United States national phase of International Application No. PCT/KR2013/005275 filed Jun. 14, 2013, and claims priority to Korean Patent Application No. 10-2012-0078311 filed Jul. 18, 2012, the disclosures of which are hereby incorporated in their entirety by reference.

TECHNICAL FIELD

The present invention relates to a battery pack in which a plurality of battery modules are accommodated so as to be easily attached and detached and electrode terminals of the battery modules are easily electrically connected to each other.

BACKGROUND ART

Generally, since a secondary battery may be charged and discharged unlike a primary battery, the secondary battery has been applied to various fields such as a digital camera, a cellular phone, a laptop computer, and a hybrid vehicle and has been actively studied. An example of the secondary battery includes a nickel-cadmium battery, a nickel-metal hydride battery, a nickel-hydrogen battery, and a lithium secondary battery. In addition, among these secondary batteries, the lithium secondary battery having a high energy density and discharging voltage has been mainly studied, and has been commercialized and widely used.

Further, the secondary battery is configured in a form of a battery module in which a plurality of battery cells are stacked due to the necessity of a high output and a large capacity, and is configured of one battery pack by stacking and arranging a plurality of battery modules in parallel with each other and connecting positive electrode terminals and negative electrode terminals of neighboring battery modules to each other by bus bars.

Here, the bus bar has through-holes formed in both sides thereof, and the positive electrode terminal and the negative electrode terminal protruding outwardly of the battery modules are inserted into the through-holes and are fastened and are closely adhered and coupled thereto by a nut, thereby forming the battery pack in which the positive electrode terminal and the negative electrode terminal are electrically connected to each other.

However, when the battery modules are connected to each other by fastening the nut as described above, it is difficult to assemble the battery pack by stacking the battery modules or to perform disassembling and assembling at the time of maintenance due to abnormality of the battery pack.

As the related art, EP Patent Application Publication No. 2,337,119 entitled "Medium or Large Battery Pack Including Electrode Connection Device" has been disclosed.

RELATED ART DOCUMENT

Patent Document

EP 2337119 A2 (2011 Jun., 22)

DISCLOSURE

Technical Problem

An object of the present invention is to provide a battery pack in which electrode terminals of battery modules are easily connected to each other and the battery modules are easily fixed and attached and detached.

Technical Solution

In one general aspect, a battery pack includes: a plurality of socket terminals having a plurality of elastic contactors extendedly formed at one side of a cylindrical body thereof so as to be spaced apart from each other by a predetermined distance in a circumferential direction; a plurality of sockets enclosing outer sides of the socket terminals and coupled to the socket terminals so as to be closely adhered thereto; a plurality of flexible bus bars having both sides coupled to a pair of sockets; a case having the socket terminals, the sockets, and the flexible bus bars accommodated therein and fixed thereto; a sub pack case having a plurality of receiving parts formed therein, each of the plurality of receiving parts having a sub pack case cover hinge-coupled to one side thereof and having the case coupled to the other side thereof; and a plurality of battery modules seated in the receiving parts of the sub pack case, having electrode terminals protruding from one sides thereof, and having the sub pack case cover coupled and fixed thereto, the electrode terminals being closely adhered and coupled into the socket terminals so as to be inserted into the socket terminals to thereby be electrically connected thereto.

The sub pack case covers may be formed at one sides of the plurality of receiving parts, respectively.

The battery module may have a fixing groove formed therein, and the sub pack case cover may have a fixing part formed therein so as to be coupled to the fixing groove.

The fixing part may include a horizontal plate having one side coupled to the sub pack case cover; an inclined plate coupled to the other side of the horizontal plate and formed at a lower side of the horizontal plate so as to be inclined; and a hooking protrusion formed at a free end of the inclined plate and hooked to the fixing groove, and the fixed part may be formed at an upper side of a cut part formed in the sub pack case cover.

The horizontal plate and the inclined plate may protrude outwardly of a vertical part of the sub pack case cover.

A protecting cover covering outer sides of the horizontal plate and the inclined plate may be formed.

Advantageous Effects

In the battery pack according to an exemplary embodiment of the present invention, since a terminal stand into which the electrode terminals of the battery modules may be inserted and connected in a press-fitting scheme is formed at one side of the sub pack case in which the battery modules are accommodated, the battery modules may be easily electrically connected to each other, and the sub pack case cover hinge-coupled to the other side of the sub pack case is closed to fix the battery modules, such that the battery modules may be easily attached and detached.

DESCRIPTION OF DRAWINGS

FIGS. 9A to 10 are a perspective view and a cross-sectional view showing a fixing part of a sub pack case cover according to an exemplary embodiment of the present invention.

DETAILED DESCRIPTION OF MAIN ELEMENTS

Figure 1:
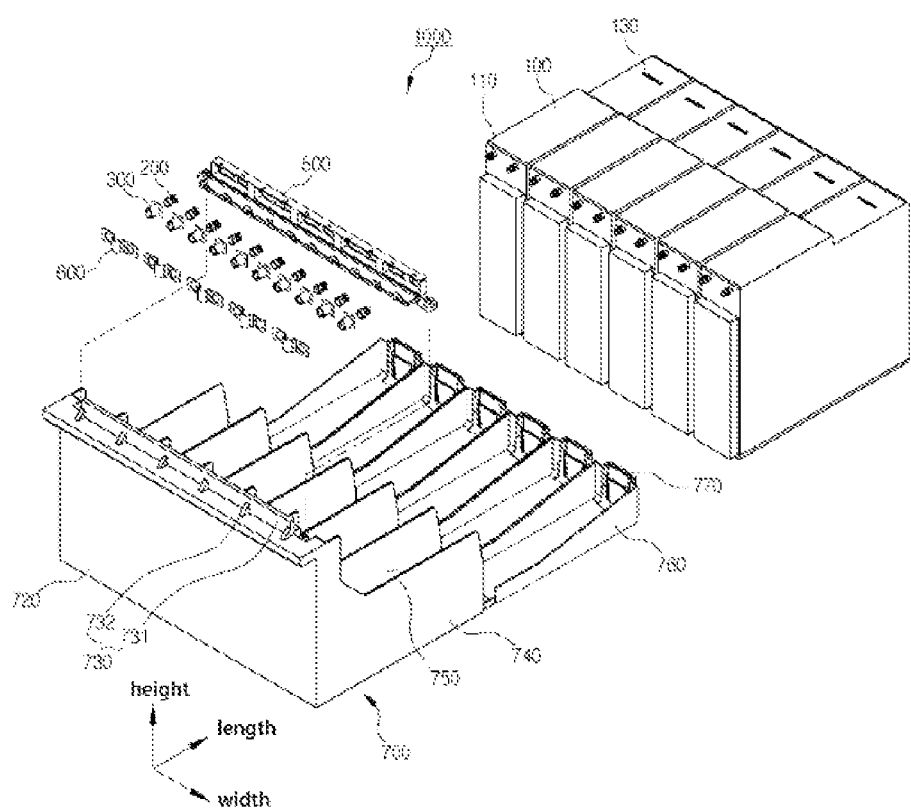
FIGS. 1 to 4 are an exploded perspective view and an assembled perspective view showing a battery pack according to an exemplary embodiment of the present invention.
Figure 2:
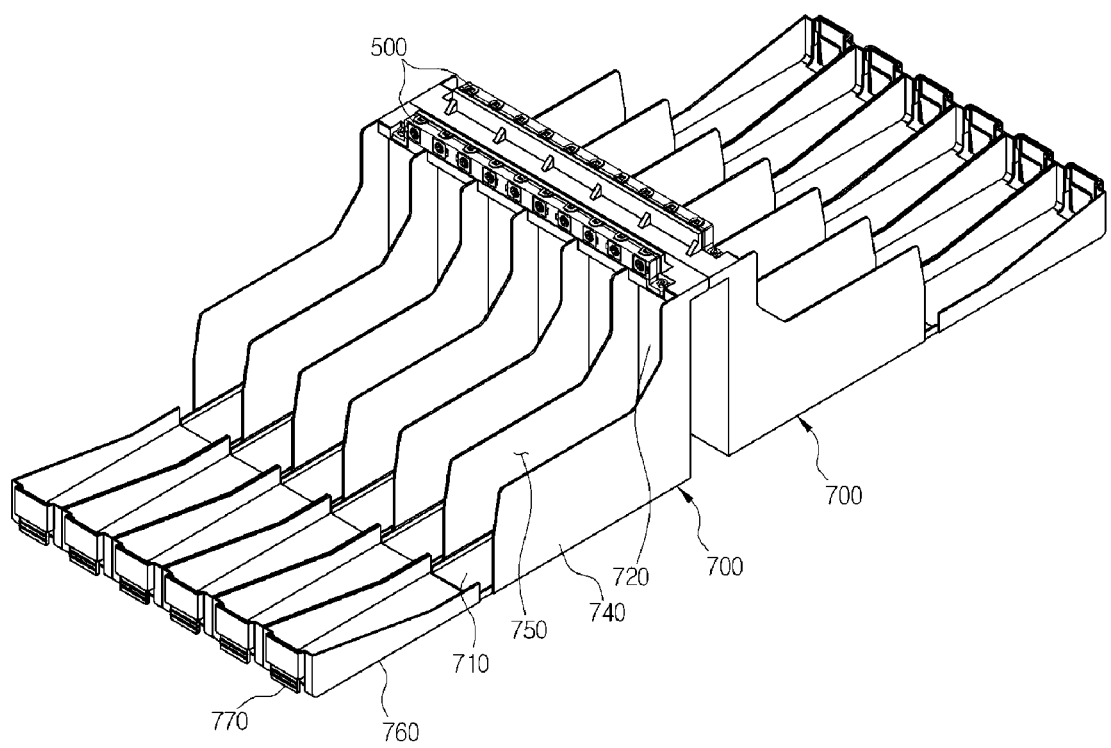
Figure 3:
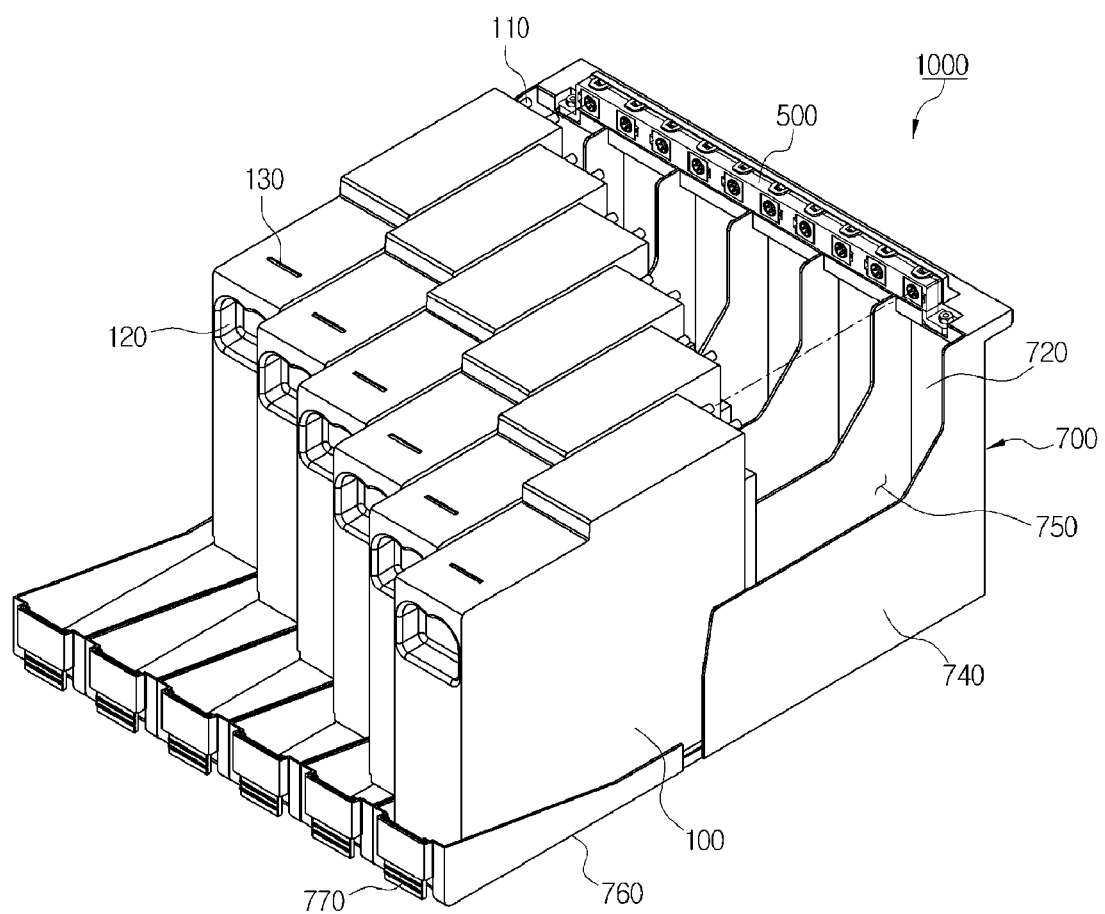
Figure 4:
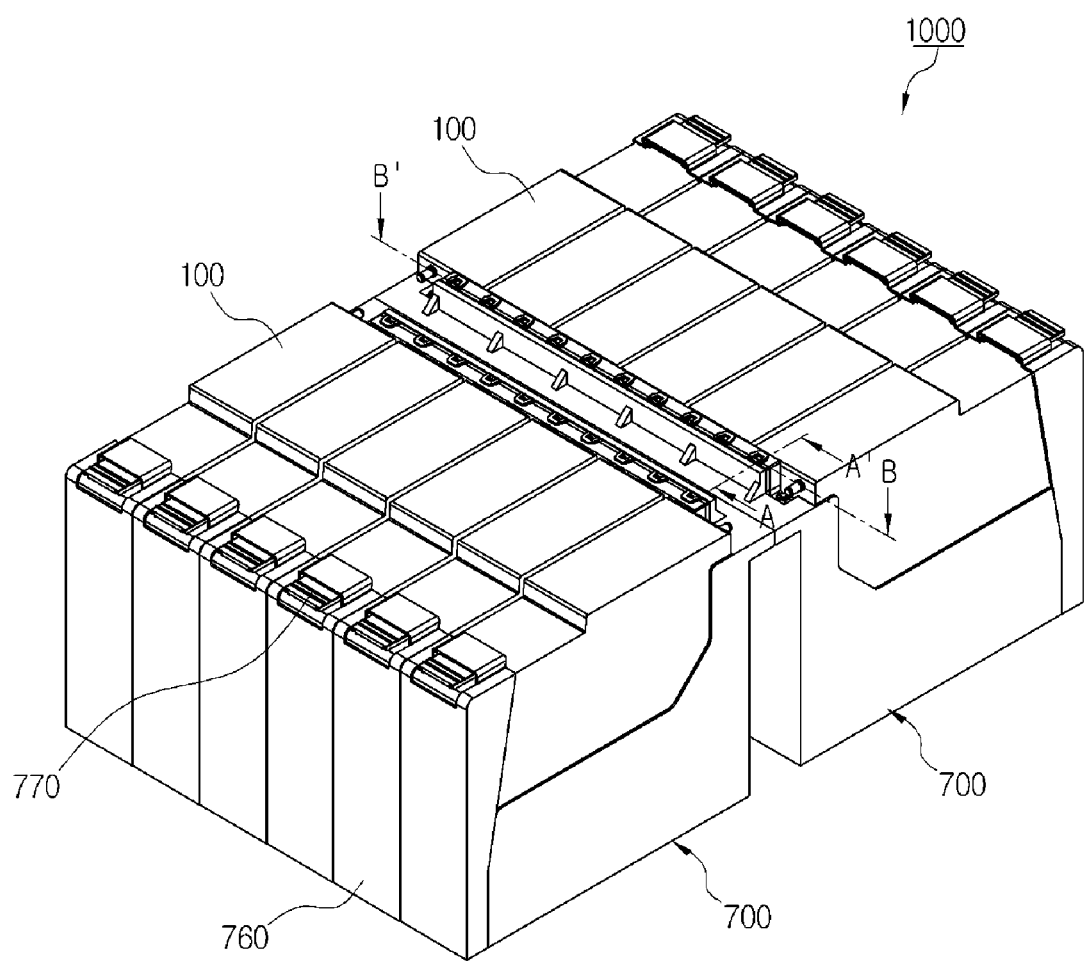

| | | | |
|---|---|---|---|
| 1000: battery pack | | | |
| 100: battery module | | | |
| 110: electrode terminal | | 111: protruding end | |
| 120: groove (protrusion) | | 130: fixing groove | |
| 200: socket terminal | | | |
| 210: body | | 211: coupling hole | |
| 212: rotation preventing groove | | | |
| 220: elastic contactor | | 221: bent part | |
| 300: socket | | | |
| 310: body | | 311: hooking protrusion | |
| 312: jaw | | 320: vertical plate | |
| 500: case | | | |
| 510: case body | | 511: seating part | |
| 520: partition wall | | 521: fixing protrusion | |
| 530: cover | | 540: fixing ring | |
| 600: flexible bus bar | | | |
| 610: through-hole | | 611: bent part | |
| 612: cut part | | | |
| 700: sub pack case | | | |
| 710: horizontal part | | 720: vertical part | |
| 730: support part | | | |
| 731: support plate | | 732: rib | |
| 740: side plate | | 750: receiving part | |
| 760: sub pack case cover | | 761: cut part | |
| 770: fixing part | | | |
| 771: horizontal plate | | 772: inclined part | |
| 773: hooking protrusion | | 774: protecting cover | |

BEST MODE

Hereinafter, a battery pack having attachable and detachable battery modules according to an exemplary embodiment of the present invention will be described in detail with reference to the accompanying drawings.

FIGS. 1 to 4 are an exploded perspective view and an assembled perspective view showing a battery pack according to an exemplary embodiment of the present invention.

As shown, a battery pack 1000 according to an exemplary embodiment of the present invention is configured to include a plurality of socket terminals 200 having a plurality of elastic contactors 220 extendedly formed at one side of a cylindrical body 210 thereof so as to be spaced apart from each other by a predetermined distance in a circumferential direction; a plurality of sockets 300 enclosing outer sides of the socket terminals 200 and coupled to the socket terminals 200 so as to be closely adhered thereto; a plurality of flexible bus bars 600 having both sides coupled to a pair of sockets 300; a case 500 having the socket terminals 200, the sockets 300, and the flexible bus bars 600 accommodated therein and fixed thereto; a sub pack case 700 having a plurality of receiving parts 750 formed therein, each of the plurality of receiving parts 750 having a sub pack case cover 760 hinge-coupled to one side thereof and having the case 500 coupled to the other side thereof; and a plurality of battery modules 100 seated in the receiving parts 750 of the sub pack case 700, having electrode terminals 110 protruding from one sides thereof, and having the sub pack case cover 760 coupled and fixed thereto, the electrode terminals 110 being closely adhered and coupled into the socket terminals 200 so as to be inserted into the socket terminals 200 to thereby be electrically connected thereto.

First, the socket terminal 200 has the plurality of elastic contactors 220 formed at one side of the cylindrical body 210, wherein the elastic contactors 220 are formed so as to be spaced apart from each other by a predetermined distance in the circumferential direction. The cylindrical body 210 has an inner diameter larger than an outer diameter of the electrode terminal 110, such that the socket terminal 200 may be easily inserted onto the outer side of the electrode terminal 110. In addition, the elastic contactors 220 are formed in a form in which they are bent toward a central axis of the cylindrical body 210, such that an inner diameter formed by the plurality of elastic contactors 220 is smaller than the outer diameter of the electrode terminal 110. Therefore, when the electrode terminal 110 is coupled to the socket terminal 200 so as to be inserted into the socket terminal 200, the elastic contactors 220 of the socket terminal 200 are closely adhered to the electrode terminal 110.

The socket 300 may be inserted onto and be closely adhered and coupled to an outer side of the socket terminal 200, and be formed in a cylindrical shape so as to enclose the outer side of the socket terminal 200.

Both sides of the flexible bus bar 600 are coupled to a pair of sockets 300 by welding, or the like. Therefore, a positive electrode terminal and a negative electrode terminal of two battery modules 100 are configured so as to be electrically connected to each other by the flexible bus bar 600.

The case 500 has one side that is opened and an inner portion that is hollow, such that it is lengthily formed in a width direction, and the socket terminals 200, the sockets 300, and the flexible bus bars 600 are accommodated in and fixed to the case 500 in a state in which they are coupled to each other. As described above, a terminal stand in which the plurality of socket terminals 200, sockets 300, and flexible bus bars 600 are fixed in a state in which they are coupled to each other in the case 500.

The sub pack case 700 may have a vertical part 720 formed in a 'ㄴ' shape at one side of a horizontal part 710 thereof so that the battery modules 100 are seated therein, wherein the vertical part 720 has the case 500 coupled thereonto. Here, the case 500 has brackets formed at both sides thereof in the width direction, and through-holes are formed in the brackets, such that the case 500 may be coupled to the sub pack case 700 using a fastening means at an upper side in a height direction. In addition, the sub pack case 700 has a plurality of side plates 740 coupled to the horizontal part 710 and the vertical part 720 and formed vertically therein, and the plurality of receiving parts 750 in which the battery modules 100 may be accommodated are formed by the side plates 740. In addition, the horizontal part 710 is provided with the sub pack case cover 760 hinge-coupled to an opposite side to a side at which the vertical part 720 is formed.

Therefore, in a state in which the battery modules 100 are inserted into the receiving parts 750 so that the electrode terminals 110 thereof are directed toward the case 500, the battery modules 100 are pushed toward the case 500, such that the electrode terminals 110 are coupled to the socket terminals 200 fixed to an inner portion of the case 500 so as to be press-fitted into the socket terminals 200. Then, the sub pack case cover 760 is closed, such that the battery modules 100 are fixed to the sub pack case 700. Here, a positive electrode terminal and a negative electrode terminal of two neighboring battery modules 100 are connected to each other by the flexible bus bar 600, such that the plurality of battery modules 100 may be connected in series with each other. In addition, in the case of separating the assembled battery modules in order to perform check and maintenance on the battery modules, the battery modules are pulled in an opposite direction to a direction in which they are inserted and coupled, such that they may be easily separated. Here, the battery module 100 may have a protrusion or a groove 120 formed so as to be easily attached and detached.

As described above, in the battery pack according to an exemplary embodiment of the present invention, since the terminal stand into which the electrode terminals of the battery modules may be inserted and connected in a press-fitting scheme is formed at one side of the sub pack case in which the battery modules are accommodated, the battery modules may be easily electrically connected to each other, and the sub pack case cover hinge-coupled to the other side of the sub pack case is closed to fix the battery modules, such that the battery modules may be easily attached and detached.

Therefore, since the flexible bus bars may be coupled to the electrode terminals of the battery modules in the press-fitting scheme by the elastic contactors of the socket terminals inserted and coupled into the sockets, a separate tool for electrical connection of the electrode terminals is not required, and the electrode terminals are simply connected to each other. In addition, the number of processes for connecting the electrode terminals and the flexible bus bars to each other and a time required for these processes may be decreased, and quality problems such as a problem that a nut becomes loose, a contact defect, and the like, due to insufficiency of a fastening torque that may occur in a nut fastening scheme may be solved.

In addition, terminals connected to a power cable of an external device may be coupled and connected to a positive electrode terminal and a negative electrode terminal of battery modules 100 disposed at the outermost portion using the socket terminals 200 and the sockets 300.

Further, the sub pack case 700 may have a support part 730 formed so as to support an opposite side to a side of the case 500 to which the battery modules 100 are closely adhered. This is to form the support part 730 on the vertical part 720 of the sub pack case 700 to support the opposite side when closely adhering the battery modules 100 so that the electrode terminals 110 are inserted into the socket terminals 200 within the case 500, and the support part 730 may include a support plate 731 and a plurality of ribs 732.

In addition, in the battery pack 1000 according to an exemplary embodiment of the present invention, the sub pack case 700 may also be formed in a symmetrical shape so that the plurality of battery modules 100 are disposed in two rows.

Further, the sub pack case covers 760 may be formed at one sides of the plurality of receiving parts 750, respectively. That is, one sub pack case cover 760 may be formed at one receiving part 750 to make it easy to assemble or disassemble each of the plurality of battery modules 100.

Figure 9:
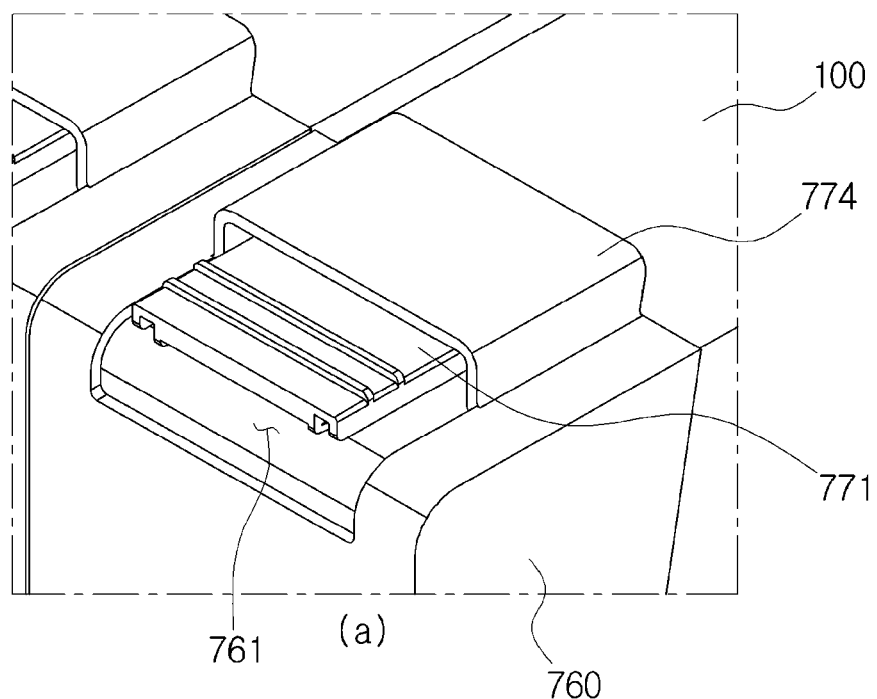
Figure 9:
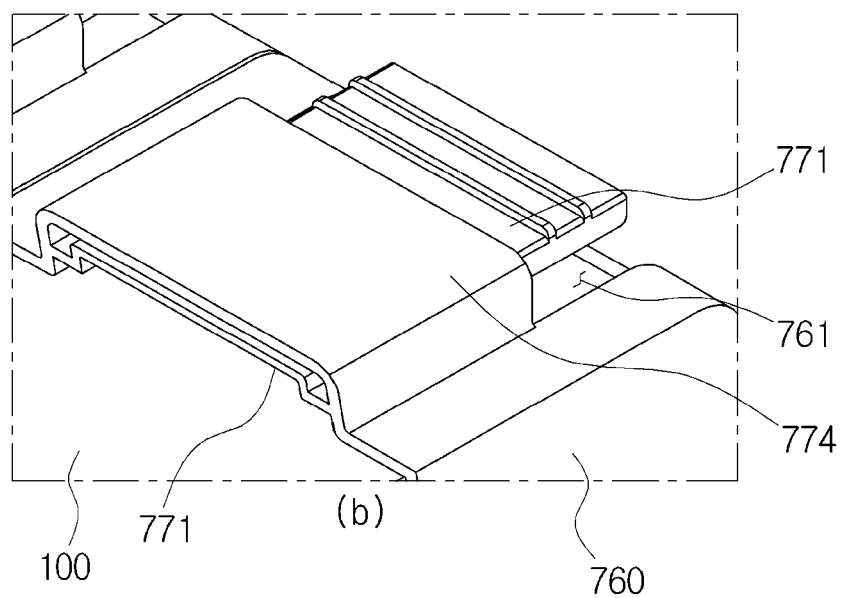

In addition, the battery module 100 has a fixing groove 130 formed therein, and the sub pack case cover 760 has a fixing part 770 formed therein so as to be coupled to the fixing groove 130. That is, as shown in FIGS. 9A to 10, the sub pack case cover 760 may be closed to thereby be coupled and fixed to the battery module 100, and the fixing part 770 may be formed in a hook shape so as to be hooked and fixed to the fixing groove 130.

Here, the fixing part 770 may include a horizontal plate 771 having one side coupled to the sub pack case cover 760; an inclined plate 772 coupled to the other side of the horizontal plate 771 and formed at a lower side of the horizontal plate 771 so as to be inclined; and a hooking protrusion 773 formed at a free end of the inclined plate 772 and hooked to the fixing groove 130, and the fixing part 770 may be formed at an upper side of a cut part 761 formed in the sub pack case cover 760. This is formed so that the cut part 761 is formed in the sub pack case cover 760, one side of the horizontal plate 771 is fixed to the upper side of the cut part 761, the inclined plate 772 is coupled to the other side thereof, and the hooking protrusion 773 is formed at the free end of the inclined plate 772 to allow the hooking protrusion 773 to be hooked to the fixing groove 130 formed at an upper side of the battery module 100. Therefore, when the sub pack case cover 760 is closed and fixed to the battery module 100, the hooking protrusion 773 may be fixed in a state in which it is inserted into the fixing groove 130 of the battery module 100 by elasticity of the horizontal plate 771 and the inclined plate 772.

Figure 10:
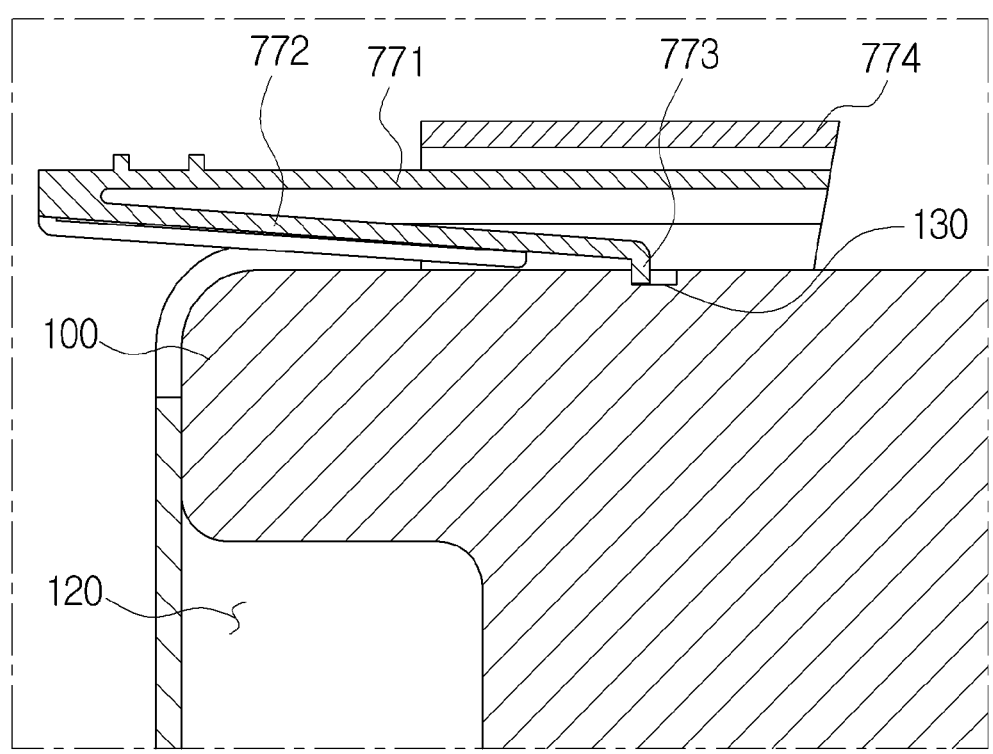

In addition, the horizontal plate 771 and the inclined plate 772 may protrude outwardly of a vertical part of the sub pack case cover 760 That is, as shown in FIG. 10, a portion at which the horizontal plate 771 and the inclined plate 772 are connected to each other protrudes outwardly of a front vertical part of the sub pack case cover 760. Therefore, when the sub pack case cover 760 is opened and separated from the battery module 100, the sub pack case cover 760 may be easily separated from the battery module 100 in a state in which the hooking protrusion 773 is unhooked from the fixing groove 130 by pressing the horizontal plate 771 and the inclined plate 772 with a hand.

In addition, a protecting cover 774 covering outer sides of the horizontal plate 771 and the inclined plate 772 may be formed. That is, the protecting cover 774 is formed, thereby making it possible to prevent a phenomenon that the horizontal plate 771 and the inclined plate 772 are damaged or pressed due to external impact, or the like, to unhook the hooking protrusion 773 inserted into the fixing groove 130 from the fixing groove 130, such that the sub pack case cover 760 is separated from the battery module 100.

Figure 5:
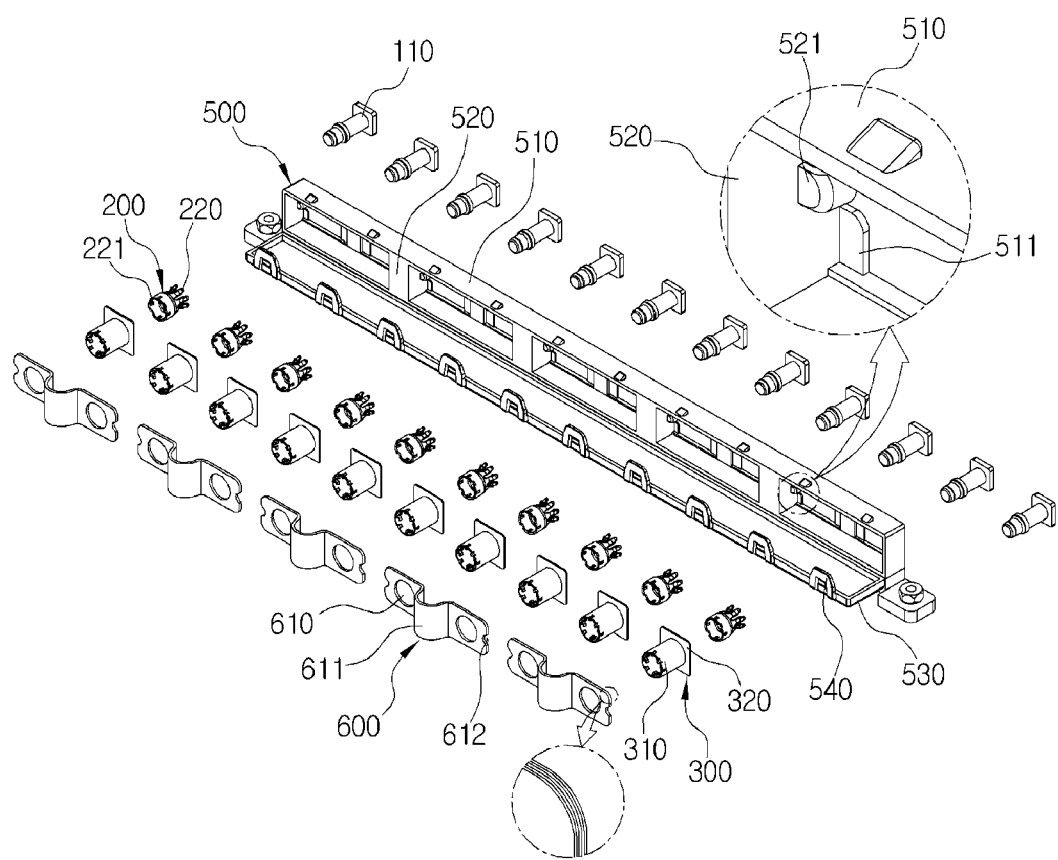
FIGS. 5 and 6 are an exploded perspective view and an assembled perspective view showing a terminal stand according to an exemplary embodiment of the present invention.
Figure 6:
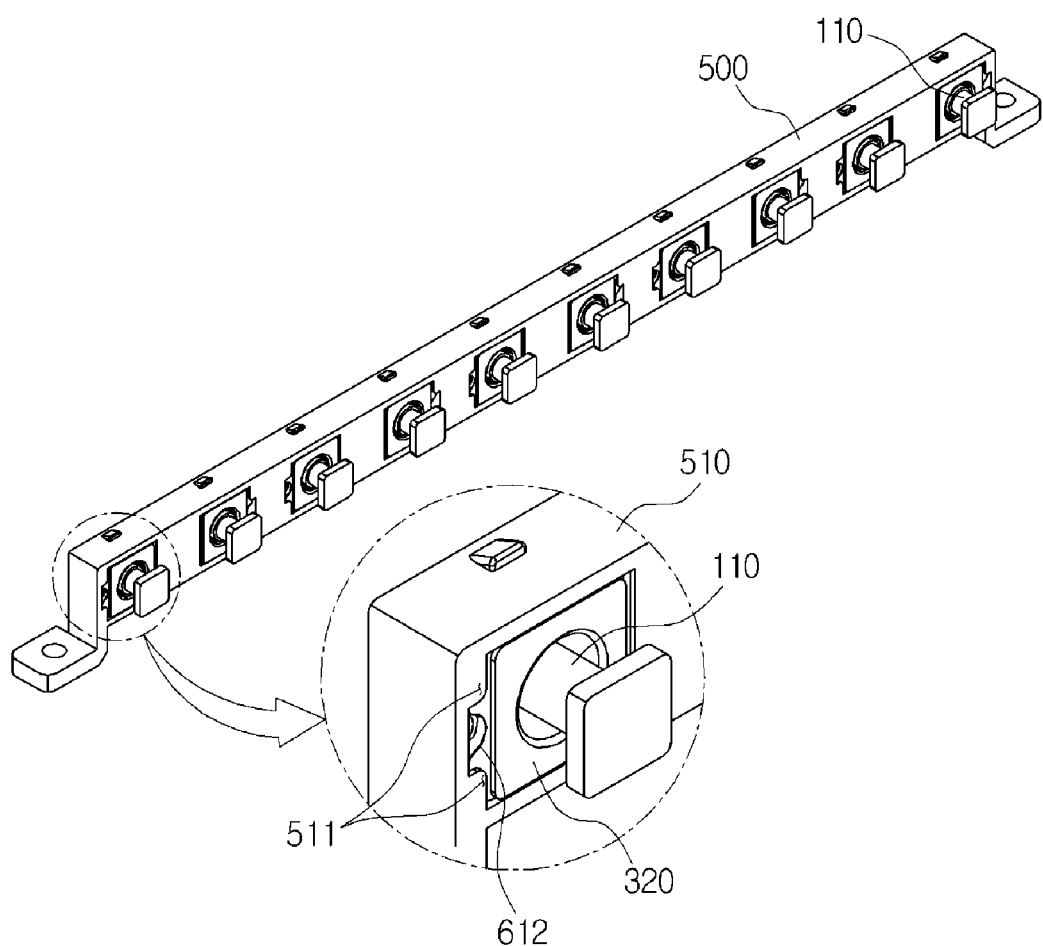
Figure 7:
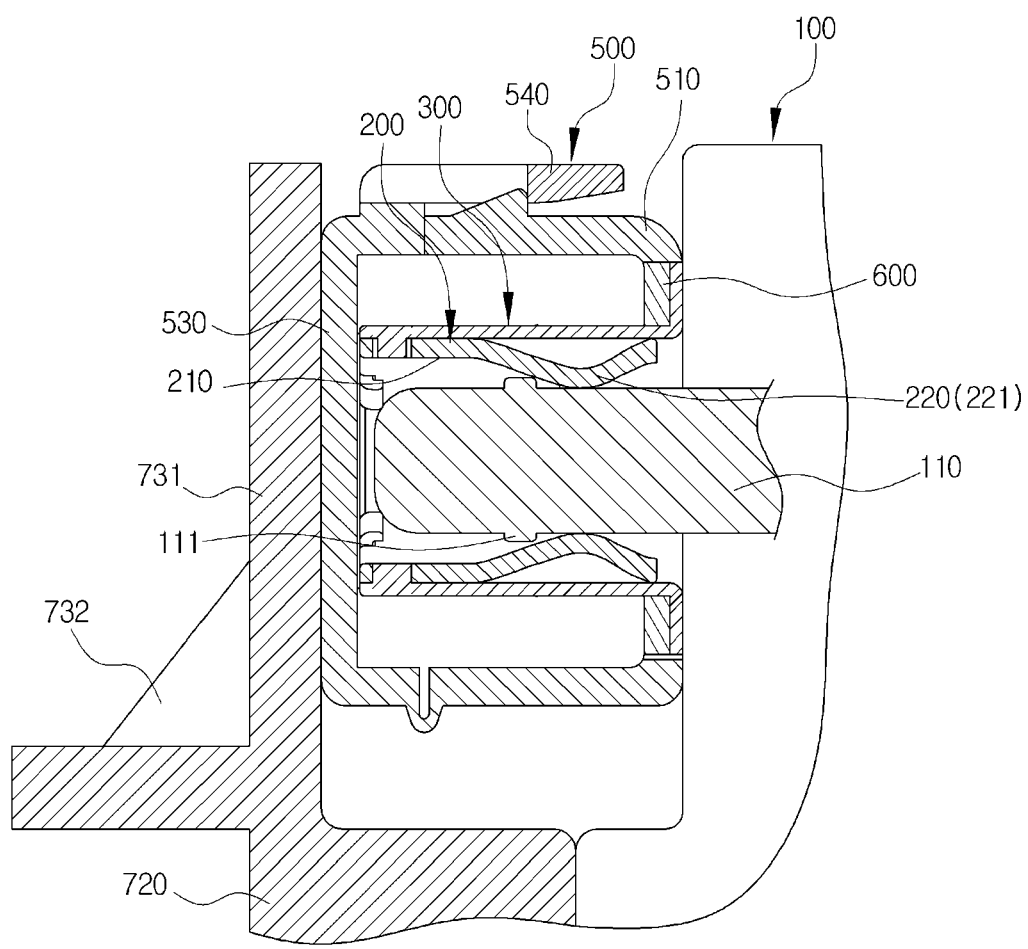
FIGS. 7 and 8 are cross-sectional views taken along line A-A' and line B-B' of FIG. 4.
Figure 8:
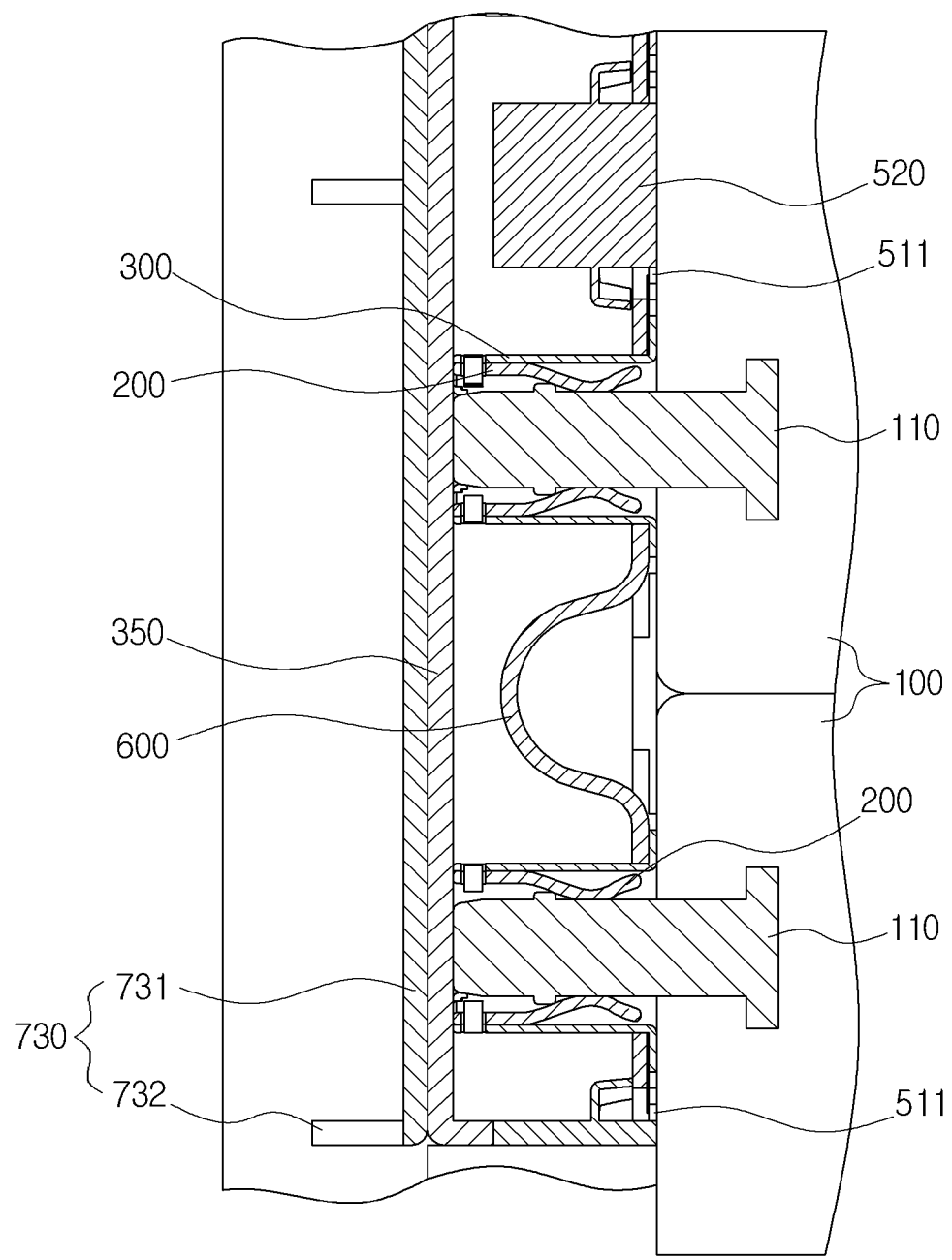

In addition, the case 500 has a plurality of accommodating parts formed therein by partition walls 520 partitioning an inner portion thereof, as shown in FIGS. 5 and 6, and a pair of socket terminals 200, a pair of sockets 300, and the flexible bus bar 600 may be accommodated in and fixed to each of the plurality of accommodating parts. Therefore, since the pair of socket terminals 200, the pair of sockets 300, and the flexible bus bar 600 are separately accommodated in each of the accommodating parts of the case 500 in a state in which they are coupled to each other, an electric short-circuit between neighboring components may be prevented, and components may be easily fixed into the case.

In addition, the case 500 has seating parts 511 formed at each accommodating part thereof so that both sides of the flexible bus bar 600 are seated and has fixing protrusions 521 protruding from both sides of an inner portion of the accommodating part, and the flexible bus bar 600 has cut parts 612 formed therein so as to correspond to the fixing protrusions 521, such that the flexible bus bar 600 may be closely adhered and fixed to the seating parts 511 by the fixing protrusion 521. This is to fix the pair of socket terminals 200, the pair of sockets 300, and the flexible bus bar 600 coupled to the accommodating part of the case 500, and the seating parts 511 are formed on an opened surface of the case 500 corresponding to a side into which the electrode terminals 110 of the battery modules 100 are inserted, as shown in FIGS. 5 to 8, such that one surfaces of the flexible bus bars 600 are closely adhered to the seating parts 511 and the other surfaces thereof are pressed and fixed by the fixing protrusions 521. Here, the fixing protrusion 521 may be formed in a 'ㄱ' shape on an inner side wall of the case 500, and an outer side of a bent portion of the fixing protrusion 521 may be formed in an inclined shape or a round shape so that the cut part 612 of the flexible bus bar 600 is easily slid when being press-fitted.

In addition, the socket terminal 200 may have bent parts 221 formed by bending portions of the elastic contactors 220 in the length direction toward the center, and the bent parts 221 of the elastic contactors 220 may be closely adhered to an outer peripheral surface of the electrode terminal 110. Therefore, when the electrode terminal 110 is inserted in a state in which the socket terminal 200 is inserted and coupled into the socket 300, the body 210 of the socket terminal 200 and the other sides (free ends) of the elastic contactors 220 of the socket terminal 200 are closely adhered to an inner peripheral surface of the socket 300, and the bent parts 221 are closely adhered to the outer peripheral surface of the electrode terminal 110, such that electrical connection may be stabilized. Here, the electrode terminal 110 has a protruding end 111 formed on the outer peripheral surface thereof, and the socket terminal 200 may be inserted onto and coupled to the electrode terminal 110 so that the bent parts 221 of the elastic contactor 220 are caught by the protruding end 111. Therefore, the socket terminal 200 may not be easily withdrawn in an opposite direction to a direction in which it is inserted.

In addition, the socket 300 has hooking protrusions 311 protruding on the inner peripheral surface thereof, and the socket terminal 200 has a plurality of coupling holes 211 formed in the body 210 thereof, wherein the hooking protrusions 311 may be inserted into and fixed to the coupling holes 211.

In addition, the socket 300 may have jaws 312 formed on the inner peripheral surface thereof at an opposite side to a side at which it is inserted onto the electrode terminal 110. Here, the jaw 312 has an inner diameter smaller than an outer diameter of the body 210 of the socket terminal 200, such that the socket terminal 200 may be press-fitted onto the outer side of the electrode terminal 110 without being pushed out in an opposite direction to a direction in which it is inserted.

In addition, the socket terminal 200 may have rotation preventing grooves 212 formed at one side of the body 210 thereof, wherein the rotation preventing grooves 212 have the jaws 312 inserted and seated thereinto.

In addition, the socket 300 may have a vertical plate 320 formed at one side of a cylindrical body 310 thereof enclosing the outer side of the socket terminal 200 and closely adhered to the outer side of the socket terminal 200, and the flexible bus bar 600 may be closely adhered and coupled to the vertical plate 320. That is, when the vertical plate 320 is formed at one side of the cylindrical body 310 of the socket 300, the flexible bus bar 600 may be closely adhered and then welded to the vertical plate 320, such that coupling and electrical connection may be facilitated.

In addition, the flexible bus bar 600 is formed in a form in which the plurality of thin plates are stacked, has the bent part 611 formed in a U shape at the center thereof, and has both sides connected to the electrode terminals 110 of the neighboring battery modules 100. Here, the flexible bus bar 600 may have through-holes 610 formed at both sides thereof, and be coupled to the battery modules 100 so that the positive electrode terminal and the negative electrode terminal of the battery modules 100 are inserted into the through-holes 610. In addition, since the flexible bus bar 600 is formed by stacking the plurality of thin plates and has the bent part 611 formed at the center thereof, even though the flexible bus bar 600 is formed of a metal having excellent conductivity, the flexible bus bar 600 may be flexible and have elasticity to increase or decrease a distance between the through-holes 610 into which the electrode terminals 110 are inserted and absorb vibrations.

In addition, the case 500 includes a cover 530 hinge-coupled to opened one side of a case body 510 of which both sides are opened and a fixing ring 540 hinge-coupled to the cover 530, wherein the cover 530 may be closed and the fixing ring 540 may be hooked and fixed to fixing protrusions formed on the case body 510. Here, the case 500 may be fixed to the sub pack case 700 to enclose the electrode terminals 110, the socket terminals 200, the sockets 300, and the flexible bus bars 600, and the socket terminals 200 and the sockets 300 are closely adhered to the electrode terminals 110 by the cover 530 of the case 500 to prevent the socket terminals 200 and the sockets 300 from being separated from the electrode terminals 110.

The present invention is not limited to the above-mentioned exemplary embodiments but may be variously applied, and may be variously modified by those skilled in the art to which the present invention pertains without departing from the gist of the present invention claimed in the claims.

The invention claimed is:

1. A battery pack comprising:
   a plurality of socket terminals having a plurality of elastic contactors extendedly formed at one side of a cylindrical body thereof so as to be spaced apart from each other by a predetermined distance in a circumferential direction;
   a plurality of sockets enclosing outer sides of the socket terminals and coupled to the socket terminals so as to be closely adhered thereto;
   a plurality of flexible bus bars having both sides coupled to a pair of sockets;
   a case having the socket terminals, the sockets, and the flexible bus bars accommodated therein and fixed thereto;
   a sub pack case having a plurality of receiving parts formed therein, each of the plurality of receiving parts having a sub pack case cover hinge-coupled to one side thereof and having the case coupled to the other side thereof; and
   a plurality of battery modules seated in the receiving parts of the sub pack case, having electrode terminals protruding from one sides thereof, and having the sub pack case cover coupled and fixed thereto, the electrode terminals being closely adhered and coupled into the socket terminals so as to be inserted into the socket terminals to thereby be electrically connected thereto.

2. The battery pack of claim 1, wherein the sub pack case covers are formed at one side of the plurality of receiving parts, respectively.

3. The battery pack of claim 2, wherein the battery module has a fixing groove formed therein, and the sub pack case cover has a fixing part formed therein so as to be coupled to the fixing groove.

4. The battery pack of claim 3, wherein the fixing part includes a horizontal plate having one side coupled to the sub pack case cover; an inclined plate coupled to the other side of the horizontal plate and formed at a lower side of the horizontal plate so as to be inclined; and a hooking protrusion formed at a free end of the inclined plate and hooked to the fixing groove, and the fixed part is formed at an upper side of a cut part formed in the sub pack case cover.

5. The battery pack of claim 4, wherein the horizontal plate and the inclined plate protrude outwardly of a vertical part of the sub pack case cover.

6. The battery pack of claim 4, wherein a protecting cover covering outer sides of the horizontal plate and the inclined plate is formed.

* * * * *